United States Patent [19]
Hieda et al.

[11] Patent Number: 5,592,483
[45] Date of Patent: Jan. 7, 1997

[54] DATA COMMUNICATION APPARATUS ACHIEVING EFFICIENT USE OF THE MEDIA

[75] Inventors: Kaoru Hieda, Kitakatsuragi-gun; Masahiko Tsukamoto; Akira Imai, both of Nara, all of Japan

[73] Assignee: Sharp Kabushiki Kaisha, Osaka, Japan

[21] Appl. No.: 466,358

[22] Filed: Jun. 6, 1995

[30] Foreign Application Priority Data

Jul. 21, 1994 [JP] Japan ..................................... 6-169743

[51] Int. Cl.$^6$ ............................................. H04L 12/413
[52] U.S. Cl. ........................... 370/445; 370/349; 455/58.2
[58] Field of Search .................................. 370/95.1, 95.3, 370/85.1, 85.2, 85.3, 93, 94.1; 340/825.5, 825.51, 825.06; 455/58.1, 58.2

[56] References Cited

U.S. PATENT DOCUMENTS

| | | | |
|---|---|---|---|
| 4,332,027 | 5/1982 | Malcolm et al. | 370/85.3 |
| 4,661,902 | 4/1987 | Hochsprung et al. | 364/240 |
| 4,689,786 | 8/1987 | Sidhu et al. | 370/94.1 |
| 4,773,066 | 9/1988 | Kirkman | 370/85.2 |
| 5,042,083 | 8/1991 | Ichikawa | 370/85.3 |
| 5,231,634 | 7/1993 | Giles et al. | 370/95.1 |
| 5,369,639 | 11/1994 | Kamerman et al. | 370/85.3 |
| 5,371,494 | 12/1994 | Singh et al. | 370/85.3 |

FOREIGN PATENT DOCUMENTS 5-260051  10/1993  Japan .

Primary Examiner—Douglas W. Olms
Assistant Examiner—Chau T. Nguyen
Attorney, Agent, or Firm—David G. Conlin; Brian L. Michaelis

[57] ABSTRACT

When an apparatus C which shares the media with apparatuses A and B desires to transmit an RTS packet, apparatus C inhibits transmission of the RTS packet for a fixed waiting time Tm plus a transmission inhibition period which varies depending on a type of a packet in a sensed carrier. In other words, when apparatus C senses an RTS packet of apparatus A, apparatus C inhibits transmission for a packet transmission inhibition period 101 resulting from reception of RTS. When apparatus C senses a CTS packet of apparatus B, apparatus C inhibits transmission for a packet transmission inhibition period 102 resulting from reception of CTS. When apparatus C senses a data packet, apparatus C inhibits transmission for a packet transmission inhibition period 103 resulting from reception of a data packet. When apparatus C senses an ACK packet of apparatus B, apparatus C inhibits transmission for a packet transmission inhibition period 104 resulting from reception of an ACK. As a result, a data communication apparatus which achieves efficient communication between a plurality of data communication apparatuses which share the same media is provided.

13 Claims, 16 Drawing Sheets

FIG. 3

| NAME OF PACKET | RTS | CTS / CANCEL | DATA | ACK |
|---|---|---|---|---|
| DIRECTION OF TRANSMISSION AND RECEPTION | APPARATUS A → APPARATUS B | APPARATUS B → APPARATUS A | APPARATUS A → APPARATUS B | APPARATUS B → APPARATUS A |
| COMBINATION 1 | ○ | CTS ○ | ○ | SENT |
| COMBINATION 2 | ○ | CTS × | × | NONE |
| COMBINATION 3 | × | CTS × | × | NONE |
| COMBINATION 4 | ○ | CAN × | NONE | NONE |
| COMBINATION 5 | × | CAN × | NONE | NONE |

FIG. 6A

| Byte | 0 | 1 | 2 | 3 |
|---|---|---|---|---|
| 0 | ADDRESS OF RECEIVING APPARATUS | | | |
| 4 | | | | |
| 8 | ADDRESS OF TRANSMITTING APPARATUS | | | |
| 12 | UPPER LAYER PROTOCOL | | PACKET TYPE =1 | |
| 16 | ID | | FLAG | |

FIG. 6B

| Byte | 0 | 1 | 2 | 3 |
|---|---|---|---|---|
| 0 | ADDRESS OF RECEIVING APPARATUS | | | |
| 4 | | | | |
| 8 | ADDRESS OF TRANSMITTING APPARATUS | | | |
| 12 | UPPER LAYER PROTOCOL | | PACKET TYPE =2 | |
| 16 | ID | | FLAG | |

FIG. 6C

| Byte | 0 | 1 | 2 | 3 |
|---|---|---|---|---|
| 0 | ADDRESS OF RECEIVING APPARATUS | | | |
| 4 | | | | |
| 8 | ADDRESS OF TRANSMITTING APPARATUS | | | |
| 12 | UPPER LAYER PROTOCOL | | PACKET TYPE =3 | |
| 16 | ID | | FLAG | |

FIG. 7A

| Byte | 0 | 1 | 2 | 3 |
|---|---|---|---|---|
| 0 | ADDRESS OF RECEIVING APPARATUS | | | |
| 4 | | | | |
| 8 | ADDRESS OF TRANSMITTING APPARATUS | | | |
| 12 | UPPER LAYER PROTOCOL | | DATA LENGTH | |
| 16 | ID | | FLAG | |
| 20 ... N-1 | DATA | | | |

FIG. 7B

| Byte | 0 | 1 | 2 | 3 |
|---|---|---|---|---|
| 0 | ADDRESS OF RECEIVING APPARATUS | | | |
| 4 | | | | |
| 8 | ADDRESS OF TRANSMITTING APPARATUS | | | |
| 12 | UPPER LAYER PROTOCOL | | PACKET TYPE =0 | |
| 16 | ID | | FLAG | |

FIG. 15A

| METHOD | FREQUENCY | OCCUPIED BAND WIDTH | MAXIMUM TRANSFER RATE |
|---|---|---|---|
| METHOD 1 | 400MHz BAND | 8.5 KHz | 4800bps |
| METHOD 2 | 1.2GHz BAND | 32 KHz | 32Kbps |
| METHOD 3 | 2.4GHz BAND FH METHOD | 1 MHz | 1Mbps |
| METHOD 4 | 2.4GHz BAND DS METHOD | 11 MHz | 2Mbps |

FIG. 15B

| METHOD | $T_1$ | $T_2$ | $T_3$ | $T_{DM}$ |
|---|---|---|---|---|
| METHOD 1 | 33.3 msec | 1.0 msec | 30 $\mu$sec | 1.740 sec |
| METHOD 2 | 5.0 msec | 1.0 msec | 30 $\mu$sec | 0.261 sec |
| METHOD 3 | 160 $\mu$sec | 1.0 msec | 30 $\mu$sec | 8.352 msec |
| METHOD 4 | 80 $\mu$sec | 1.0 msec | 30 $\mu$sec | 4.176 msec |

DATA COMMUNICATION APPARATUS ACHIEVING EFFICIENT USE OF THE MEDIA

BACKGROUND OF THE INVENTION

1. Field of the Invention

The present invention relates to a data communication apparatus which carries out data communication in a communication network constituted by a plurality of information apparatuses, and method thereof, and more particularly, to a data communication apparatus which achieves higher efficiency in using the media, and method thereof.

2. Description of the Background Art

In a network in which a plurality of apparatuses transmit to and receive data from each other, a method of obtaining transmission right to "communication medium (media)", whether it is cable or wireless, shared among those apparatuses is predetermined, and the method is applied to those apparatuses, whereby disturbance of communication has been prevented. In addition, efficiency in using the media has been improved.

An example which implements such efforts as described above is disclosed, for example, in Japanese Patent Laying-Open No. 5-260051. A method of intensively managing an access right to the media is suggested in the document. In this method, however, no communication could be carried out if an apparatus for intensive management of an access right has a trouble. Furthermore, if an additional apparatus which shares the same media is provided, the apparatus must be registered additionally in the apparatus for intensive management of access right. In the case of wireless media, in particular, it is difficult to apply that method since the number of apparatuses which operate independently changes dynamically.

In order to avoid these problems, the following two methods have been disclosed in which an access right to the media is not managed intensively to allow each apparatus to access the media autonomously and cooperatively.

One of the methods is disclosed in the U.S. Pat. No. 4,661,902 ("Local Area Network with Carrier Sense Collision Avoidance", Apr. 28, 1987) by Hochsprung et al. (Apple Computer, Inc.). Although this method is essentially applied to a cable system network apparatus, it can be applied to a wireless system network apparatus. This method is hereinafter referred to as "conventional example A".

The other is disclosed in the U.S. Pat. No. 5,231,634 ("Medium Access Protocol for Wireless LANs", Jul. 27, 1993) by Giles et al. (Proxim, Inc.). This method is applied to a wireless system network apparatus. The method is hereinafter referred to as "conventional example P".

FIG. 16 is a schematic diagram showing transmission and reception of a packet when an apparatus A transmits data to an apparatus B which shares the media with apparatus A. Operation of conventional examples A and P will now be described with reference to FIG. 16. Basically, the same procedure of FIG. 16 which will be described below is carried out in both conventional examples A and P.

(1) Apparatus A which desires to transmit data checks if the media are in use (senses a carrier) and inhibits data transmission if in use (carrier sense step).

(2) Apparatus A transmits an RTS (Request To Send) packet 20 to the media. RTS packet 20 includes addresses of apparatus A itself and receiving apparatus B (RTS transmission step).

(3) Apparatus B which shares the media with apparatus A receives RTS packet 20. Every apparatus which receives RTS packet 20 reads out an address of a receiving apparatus included in RTS packet 20, and compares that address to an address of the apparatus itself. Apparatus B recognizes that the packet is transmitted to the apparatus B itself and transmits a CTS (Clear To Send) packet 21 in response to RTS packet 20. CTS packet 21 includes addresses of apparatus B itself and CTS receiving apparatus A (CTS transmission step). Apparatuses other than apparatus B do not respond to RTS packet 20.

(4) When apparatus A receives CTS packet 21 from apparatus B, apparatus A determines that it can obtain an access right to the media, and transmits to apparatus B a data packet 22 including contents it desires to transmit to apparatus B (data packet transmission step).

(5) (Only in conventional example P) apparatus B transmits an ACK (Acknowledgement) packet to apparatus A to acknowledge reception of the data packet from apparatus A (ACK transmission step).

In both methods, accesses from a plurality of apparatuses to the media may conflict with each other at the time of RTS transmission. In FIG. 17, since RTS packets of apparatus A and B conflict with each other and an apparatus which should respond to those RTS packets cannot receive the RTS packets correctly, the apparatus cannot transmit a CTS packet. Referring to FIG. 17, in this example in which it is assumed that conflict of accesses will occur, since apparatus A does not receive CTS 24 by the time when it should receive it (time out), conflict (collision) of accesses to the media is detected. If collision is detected, apparatus A must carry out the above described process again from the carrier sense step.

Although basic operation of the conventional examples A and P has been described above, difference between examples A and P will now be described.

Conventional example A first carries out a "process of waiting for fixed time", and then, a "process of waiting for random time".

In the "process of waiting for fixed time", a step of sensing a carrier for every 100 milliseconds is repeated four times. If no carrier is sensed, "process of waiting for random time" is next carried out. If a carrier is sensed even once, the step of sensing a carrier is again carried out four times.

In "process of waiting for random time", a random number R determined depending on an access condition of the media is generated, and a step of sensing a carrier for every 100 milliseconds is repeated R times. If no carrier is sensed, an RTS packet is transmitted. If a carrier is sensed even once, process immediately returns to "process of waiting for fixed time".

Referring back to FIG. 16, if it is ensured that each of time from completion of RTS packet 20 transmission to start of CTS packet 21 transmission ("a" in FIG. 16), time from completion of CTS packet 21 transmission to start of data packet 22 transmission ("b" in FIG. 16), and time from completion of data packet 22 transmission to start of ACK packet 23 transmission ("c" in FIG. 16) is well shorter than, for example, 400 milliseconds, no collision would occur during switching of a series of these packets unless RTS packets 20 conflicts with each other. In conventional example A, time "c" is not taken into consideration since a method of ACK packet transmission is not disclosed therein. However, the method of ACK packet transmission is herein added to conventional example A in order to clarify difference between conventional examples A and P which will be described below.

Conventional example A enables prevention of conflict of accesses to the media, and ensures that no collision will occur during transmission of a data packet from apparatus A to apparatus B by the above-described method.

Conventional example P is an improvement of conventional A, which overcomes so called "hidden terminal" problem which is specific to wireless media. In this case, a hidden terminal represents a terminal which cannot transmit to and receive data from a plurality of wireless terminals within a prescribed zone directly. In FIG. 18, apparatuses A and B can communicate with each other and apparatuses B and C can communicate with each other, while apparatuses A and C cannot communicate with each other (in this case, apparatus C is a hidden terminal with respect to apparatus A). In this case, apparatus C cannot detect transmission of a data packet from apparatus A to apparatus B. Therefore, in the method of conventional example A, apparatus C determines that no carrier is present and transmits a packet to apparatus B, and therefore, apparatus B might not receive a data packet from apparatus A correctly.

In order to solve such problems as described above, in conventional example P, an apparatus inhibits transmission of an RTS packet for the time determined by a random number. However, if another apparatus which shares the media therewith receives an RTS packet or a CTS packet which is transmitted not to the apparatus itself, the apparatus considers that a data packet will be sent thereafter, and inhibits transmission of a packet for a while thereafter. In other words, an apparatus which receives an RTS packet which is transmitted not to the apparatus itself inhibits transmission of a packet for a period "d" in FIG. 16, and an apparatus which receives a CTS packet which is transmitted not to the apparatus itself inhibits transmission of a packet for a period "e" in FIG. 16. Since periods "d" and "e" could change depending on a length of a DATA packet, the length of a DATA packet is included in an RTS packet and a CTS packet, and "d" and "e" are calculated by an apparatus which receives an RTS packet and a CTS packet based on the packet length included therein, respectively.

Conventional example P enables prevention of conflict of accesses to the media, and ensures that no conflict will occur during transmission of a data packet from apparatus A to apparatus B, by means of the above described method.

However, conventional examples A and P have the following problems.

(Problem 1)

For example, the following condition will be considered. Apparatuses A, B and C share the media and can communicate with each other, and each of apparatuses A and B alternately requests transmission of 10 data packets to apparatus C. Data packets transmitted by apparatuses A and B are sequentially represented by $Pa_0 \ldots Pa_9$ and $Pb_0 \ldots Pb_9$, respectively.

In both conventional examples A and P, if apparatus B tries to transmit an RTS corresponding to $Pb_0$ right after apparatus A transmits an RTS packet corresponding to $Pa_0$, apparatus B senses a carrier and inhibits transmission of RTS. After a period during which apparatus A sends a data corresponding to $Pa_0$, apparatus A tries transmission of $Pa_1$ and apparatus B tries re-transmission of $Pb_0$. However, which apparatus can transmit an RTS packet earlier depends on the case because time is determined by random number. Therefore, apparatus C might receive a packet in the following order.

$Pa_0, Pa_1 \ldots Pa_9, Pb_0, Pb_1 \ldots Pb_9$

In the field of the multimedia which has been studied in recent years, if apparatuses A and B send image data and audio data to apparatus C, respectively, and apparatus C reproduces the image data and the audio data as they are, image and audio are not synchronized, and therefore, it is not practical. Therefore, technique to synchronize image data and audio data with each other is required. However, each of these conventional examples A and P has highly disadvantageous characteristic to such a synchronization. Thus, in the conventional examples, since an apparatus inhibits transmission of an RTS packet for the time defined by a random number, apparatus C can not receive a packet in such an order as $Pa_0, Pb_0, Pa_1, Pb_1 \ldots Pa_9, Pb_9$.

(Problem 2)

In conventional example P, an apparatus which has received an RTS packet assumes that a series of data switching is carried out between other apparatuses and gives up obtaining the media during the data switching. However, even if an apparatus which should receive that RTS packet is not ready to receive data, the apparatus which has received the RTS packet assumes that a series of data switching is being carried out and gives up obtaining the media during the data switching, resulting in reduction in efficiency in using the media.

This condition will now be described with reference to FIG. 19. FIG. 19 shows a condition of communication when apparatuses which are adjacent to each other share the media. Referring to FIG. 19, apparatuses A and B can communicate with each other, apparatuses B and C can communicate with each other, and apparatuses C and D can communicate with each other, while other combination of apparatuses cannot carried out communication.

It is now assumed that apparatus A is not ready to receive data when apparatus B desires to communicate with apparatus A. In conventional example P, apparatus C which has received an RTS packet 51 transmitted according to this request of apparatus B considers that a CTS packet 52, a data packet 53 and an ACK packet 54 are transmitted between apparatuses A and B, and sets a packet transmission inhibition period 55, i.e., a period during which a packet is inhibited from being transmitted. Thus, apparatus C cannot return a CTS packet to apparatus D in response to RTS packets 56, 57 transmitted to apparatus C according to data transmission request of apparatus D, although, in fact, the media is not in use.

SUMMARY OF THE INVENTION

It is an object of the present invention to achieve desired communication between a plurality of data communication apparatuses which share the same media by a data communication method.

It is a further object of the present invention to provide a data communication apparatus which achieves improvement in efficiency in using the media.

It is another object of the present invention to provide a data communication apparatus which can receive, in a prescribed order, data transmitted from a plurality of apparatuses which share the same media with the apparatus, and a method thereof.

A data communication apparatus of the present invention which carries out data communication between a plurality of apparatuses which share the same media includes a packet generator for generating a packet to be transmitted to the media; a transmitter for transmitting the generated packet to the media; a packet receiver for receiving the packet from the media; a reproducing unit for reproducing the received packet; a unit for detecting when the transmitter requests transmission of a packet; a first time setting unit for setting a first prescribed time after the request for packet transmission is detected; a first determining unit for determining, within the first set time, whether data communication between a plurality of apparatuses including the apparatus itself is being carried out or not, and contents of the data communication, by means of the packet generator and the packet reproducing unit; a second time setting means for setting a second time according to a type of the detected packet if the first determining unit determines that data communication is being carried out between other apparatuses; and a unit for controlling the transmitter to transmit a prescribed packet according to the type of the detected packet after lapse of the first time and the second time.

The data communication apparatus transmits an RTS packet from the transmitter after lapse of a prescribed fixed waiting time starting from the time when the apparatus requests packet transmission to another apparatus. If the receiver senses a carrier in the media during the fixed waiting time, the media is considered to be used by other apparatuses, the apparatus waits for additional time determined according to a type of the sensed carrier. Accordingly, even if an apparatus cannot sense a carrier of only a part of a plurality of data communication apparatuses, packet transmission inhibition period is set with a waiting time determined according to a type of the sensed carrier, and therefore, packet transmission will not be inhibited for fixed time regardless of a detected carrier as in the case of the conventional examples. As a result, higher efficiency in using the media can be achieved in a plurality of data communication apparatuses which share the same media.

Preferably, a sum of the first time and the second time is fixed for a plurality of apparatuses. If the first determining unit senses data communication between other apparatuses, the first time is set to be a sum of the time before and after the second time.

A sum of the first time and the second time is fixed for all the apparatuses which share the media, and the first time is set to be a sum of the time before and after the second time if an apparatus senses data communication between other apparatuses. Therefore, if a plurality of apparatuses request data transmission to the same apparatus, order of the requests made by the plurality of apparatuses can be maintained. Consequently, if a plurality of apparatuses request data transmission to the same apparatus sequentially, order of the requests can be maintained.

In a data communication apparatus in accordance with another aspect of the present invention, a transmitter transmits a data packet after transmission of an RTS packet indicating the apparatus requests data transmission to a receiving apparatus, and reception of a CTS packet from the receiving apparatus indicating that the receiving apparatus can respond to the RTS packet. A controller controls the transmitter to transmit, within a first prescribed time, a CTS packet when a packet determined by a first determining unit is an RTS packet for the apparatus itself, and to transmit, within a first prescribed time, a data packet if the determined packet is a CTS packet for the apparatus itself.

If the first determining unit determines that another apparatus requests transmission of data to the apparatus itself, the latter apparatus transmits a prescribed packet to the former apparatus within a first prescribed time. As a result, an apparatus can determine whether there is a request for data transmission between other apparatuses after the first set time.

A data communication apparatus in accordance with a further aspect of the present invention further includes a second determining unit for determining whether the apparatus itself is ready to receive data. If a first determining unit determines the presence of an RTS packet for the apparatus itself and a second determining unit determines that the apparatus itself is not ready to receive data, a controller controls a transmitter to transmit a cancel packet (CAN) to the RTS packet transmitting apparatus within a first prescribed time.

The second determining unit transmits a cancel packet within the first prescribed time, indicating that the apparatus itself is not ready to receive data. As a result, an apparatus can determine whether data transmission between other apparatuses is carried out or not within the first prescribed time, and can carried out a process according to the cancel packet.

According to a still further aspect of the present invention, a method of carrying out data communication between a plurality of apparatuses which share the same media includes the steps of detecting when a request for packet transmission to the media is generated; setting a first prescribed time after the request for packet transmission is detected; determining, within the first time, whether there is data communication between a plurality of apparatuses including an apparatus itself, and contents of data communication, if any; setting, if there is data communication between other apparatuses, a second time according to a type of the detected packet; and transmitting a prescribed packet according to the detected packet after lapse of the first time and the second time.

Accordingly, even if an apparatus cannot sense a carrier of only a part of a plurality of data communication apparatuses which share the same media, packet transmission inhibition period is set in consideration of a waiting time determined according to a type of the detected carrier. As a result, a data communication method achieving higher efficiency in using the media can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows combinations of packet transmission and reception.

FIGS. 6A–6C show formats of an RTS packet, a CTS packet, and a cancel packet, respectively.

FIGS. 7A and 7B show formats of a CAN packet and a data packet, respectively.

FIGS. 15A and 15B show usage of communication and time to which a timer is set in the second embodiment of the present invention, respectively.

DESCRIPTION OF THE PREFERRED EMBODIMENTS (1) First Embodiment

Figure 1:
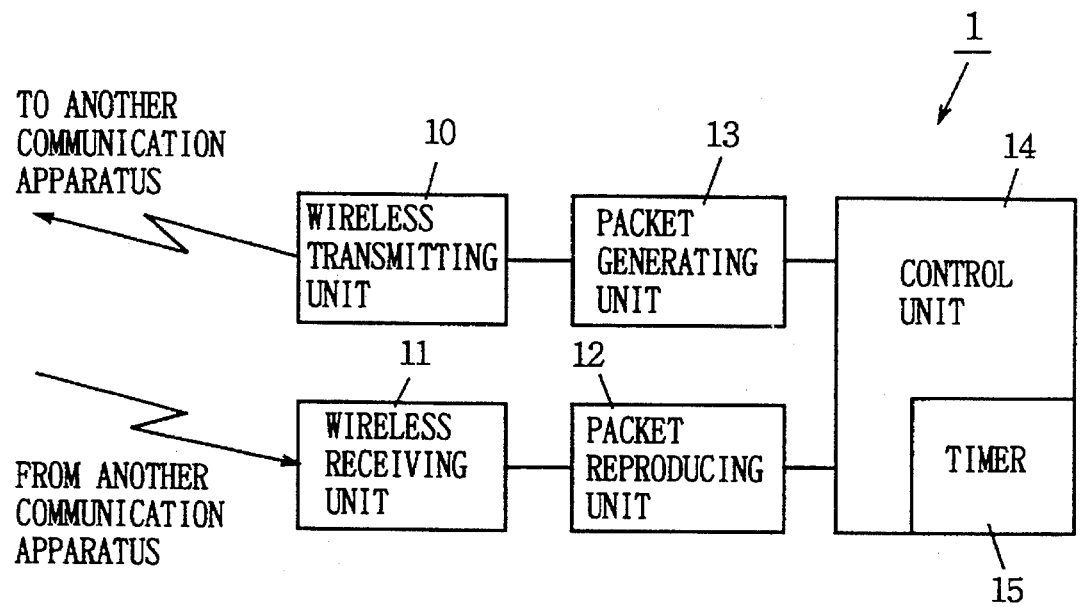
FIG. 1 is a block diagram showing an arrangement of a data communication apparatus in accordance with a first embodiment of the present invention.

An embodiment of the present invention will now be described in conjunction with the accompanying drawings. FIG. 1 is a block diagram showing components of a data communication apparatus 1 to illustrate a first embodiment of the present invention. In the first embodiment, infrared rays are applied as wireless media.

Referring to FIG. 1, data communication apparatus 1 includes a wireless transmitting unit 10 for transmitting a packet to another communication apparatus which shares the media therewith; a packet generating unit 13 for generating a packet to be transmitted to wireless transmitting unit 10; a wireless receiving unit 11 for receiving a packet from another communication apparatus which shares the media therewith; a packet reproducing unit 12 for reproducing a packet received by wireless receiving unit 11; and a control unit 14 for controlling each of the units described above. Control unit 14 includes a timer 15 which will be described below.

Wireless transmitting unit 10 includes a D/A converter (not shown) for converting a digital code train into an electric signal, a circuit for amplifying and modulating an electric signal, and an LED (Light Emitting Diode) for converting an electric signal into an infrared signal. Wireless receiving unit 11 is constituted by a pin photo diode for receiving and converting an infrared signal into an electric signal, and an amplifier for amplifying the electric signal, both of which are not shown. Packet reproducing unit 12 converts an electric signal into a digital code train, and includes an A/D converter, a CPU (Central Processing Unit) within control unit 14, and a program in a memory, all of which are not shown. Packet generating unit 13 for determining a type of each packet to be reproduced also includes the CPU within control unit 14, and a memory. The memory constituting packet generating unit 13 includes an RTS packet generating program, a CTS packet generating program, a data packet generating program, and an ACK packet generating program, and a cancel packet generating program.

Figure 2:
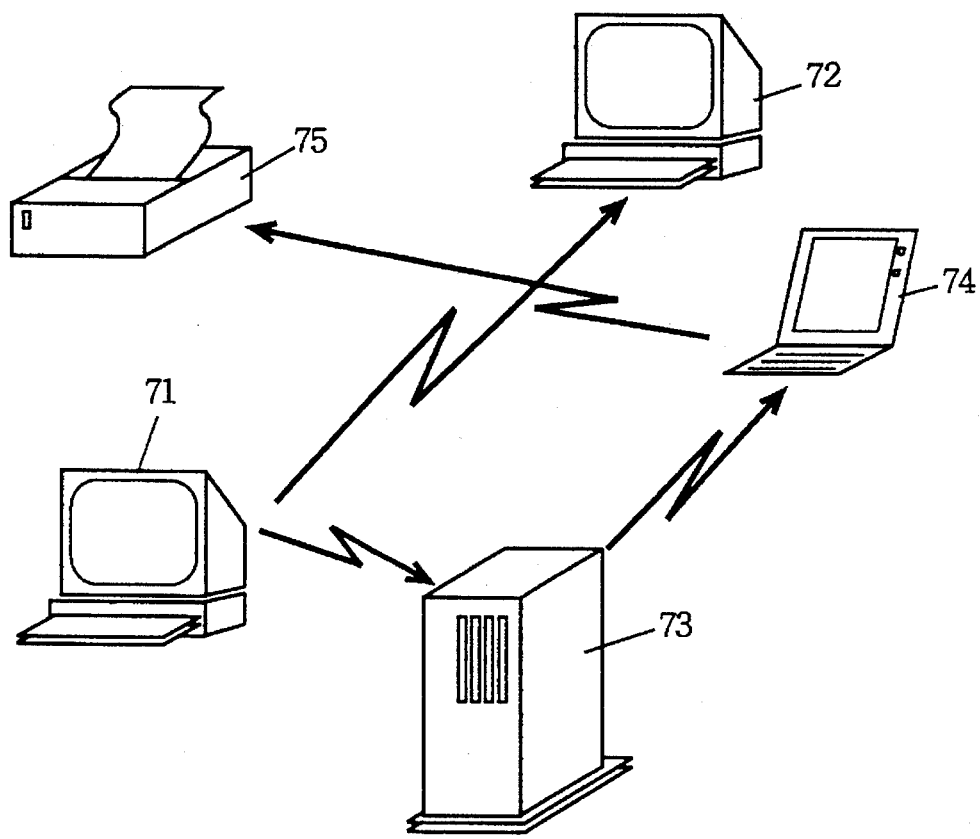
FIG. 2 is a schematic diagram showing how data communication is carried out between apparatuses incorporating a data communication apparatus in accordance with the present invention.

FIG. 2 is a schematic diagram showing a condition in which the data communication apparatus shown in FIG. 1 is applied actually. Referring to FIG. 2, data communication apparatus 1 is incorporated, for example, into personal computers 71, 72, a server 73, a notebook personal computer 74, a printer 75 and the like. Each of these apparatuses carries out data communication with each other through wireless media. It is noted that an arrow herein indicates a direction of data transmission.

The following is the description of the procedure of data transmission by apparatuses A and B to which a data communication apparatus in accordance with the present invention is applied. It is assumed that apparatus A transmits data to apparatus B. In this case, data transmission is carried out by the following procedure.

(1) An RTS packet is transmitted from apparatus A to apparatus B.

(2) ACTS packet is transmitted from apparatus B to apparatus A.

(3) A DATA packet is transmitted from apparatus A to apparatus B.

(4) An ACK packet is transmitted from apparatus B to apparatus A.

It is noted that transmission of the ACK packet is not always necessary, but could be carried out only when a user desires reliable data communication. In addition, information of whether an ACK packet is transmitted or not could be added to each packet, in order that whether an ACK packet is transmitted or not can be decided depending on a condition of a data receiving apparatus even if a data transmitting apparatus requests transmission of an ACK packet. Such a decision can be made by setting an ACK flag. Combinations of packets described above are such as shown in FIG. 3. FIG. 3 shows types of combination of the packets. The ACK flag can be set in the RTS packet and the data packet. In FIG. 3, o indicates that the ACK flag in a packet is set, and x indicates that the ACK flag in a packet is not set. In addition, "None" indicates that a packet has not been transmitted.

Referring to FIG. 3, a combination 1 is an example in which apparatus A transmits data to apparatus B after apparatus B acknowledges a request of apparatus A for reliable data transmission, and apparatus B sends an ACK packet to apparatus A.

A combination 2 is an example in which apparatus B rejects a request of apparatus A for reliable data transmission, and apparatus A transmits data to apparatus B, considering that transmission of an ACK packet is not necessary.

A combination 3 is an example in which apparatus A requests data transmission which is not critical with respect to reliability, and transmits data to apparatus B.

A combination 4 is an example in which apparatus A requests reliable data transmission (with an ACK) to apparatus B, and apparatus B indicates that it cannot receive data.

A combination 5 is an example in which apparatus A requests data transmission to apparatus B, which is not critical with respect to reliability, and apparatus B indicates that it cannot receive data.

Figure 4:
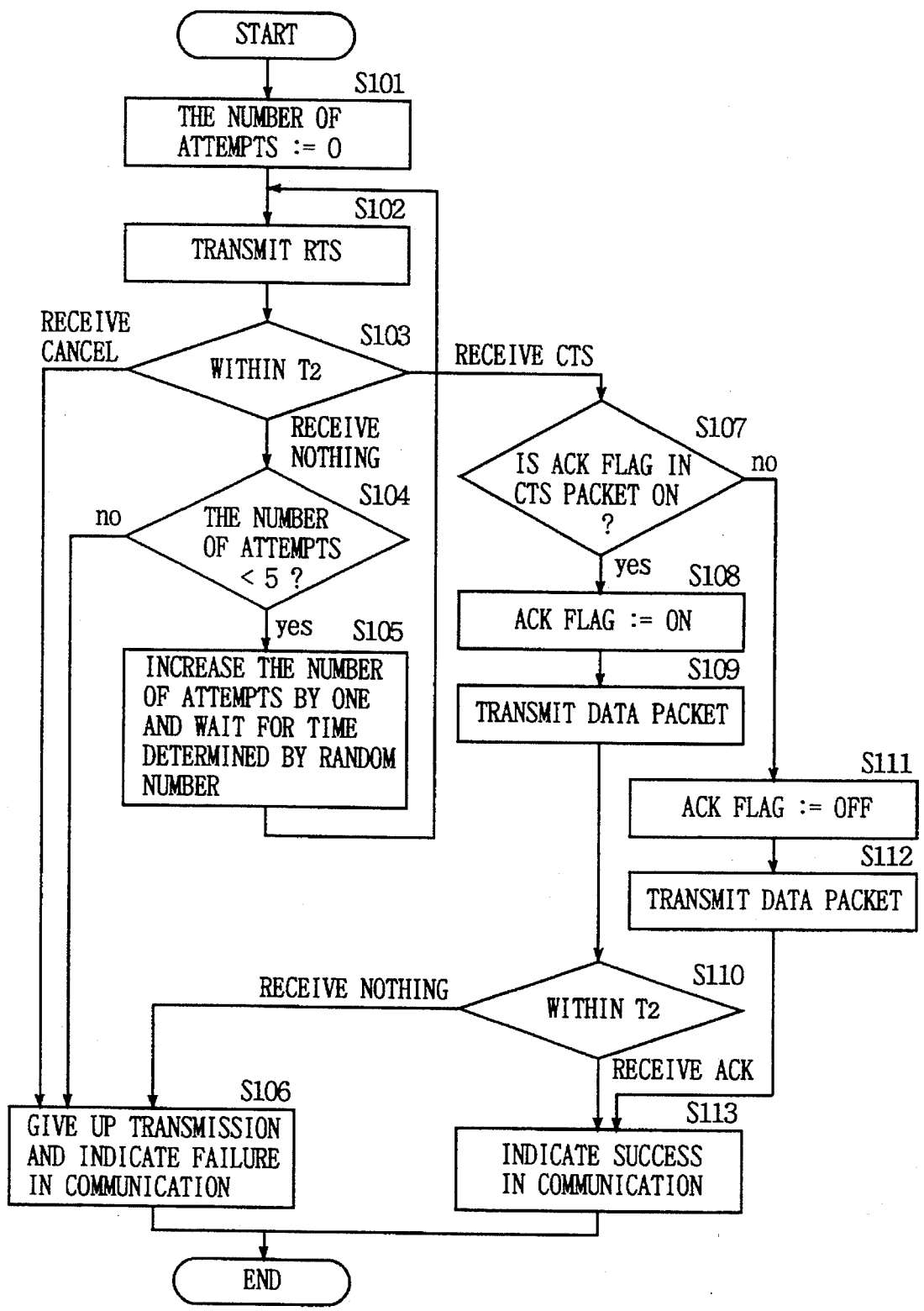
FIG. 4 is a flow chart showing steps of operation of a data transmitting apparatus.

Operation of a data transmitting apparatus will now be described. FIG. 4 is a flow chart showing the operation of the data transmitting apparatus. Referring to FIG. 4, the number of attempts of RTS packet transmission is initialized to 0

(step S101, the tem step is omitted hereinafter). Then, the apparatus attempts to transmit an RTS packet (S102). The apparatus waits for a CTS packet for a prescribed time $T_2$ (S103). If the apparatus receives a CAN (cancel) packet, or receives nothing even if it attempts to send an RTS packet five times or more (no at S104), it gives up transmission and indicates failure in transmission (S106). If the apparatus receives a CTS packet, it determines whether an ACK flag in the CTS packet is on (set) or not (S107). If the ACK flag in the CTS packet is on (yes at S107), the apparatus transmits a data packet with the ACK flag being on (S108, S109). Otherwise (no at S107), the apparatus transmits a data packet with the ACK flag being off, and indicates success in transmission (S111–S113). The apparatus waits for an ACK packet for a prescribed time $T_2$ which will be described below, only when it requests an ACK packet (S110). If the apparatus does not receive the ACK packet within the prescribed time $T_2$, it indicates failure in transmission (S106), and indicates success in communication if it receives it (S113).

If the number of attempts at RTS packet transmission is less than 5 in S104 (yes at S104), the apparatus increases the number of attempts of RTS packet transmission, waits for a time period determined by a random number, and returns to S102. If the apparatus detects collision with other apparatuses, for example, at the time of first attempt at an RTS transmission, there might occur collision if the apparatus transmits an RTS packet at the same timing thereafter. Therefore, the apparatus waits for a time period determined by a random number in order to delay the transmission timing thereby possibly to avoid the collision.

Figure 5:
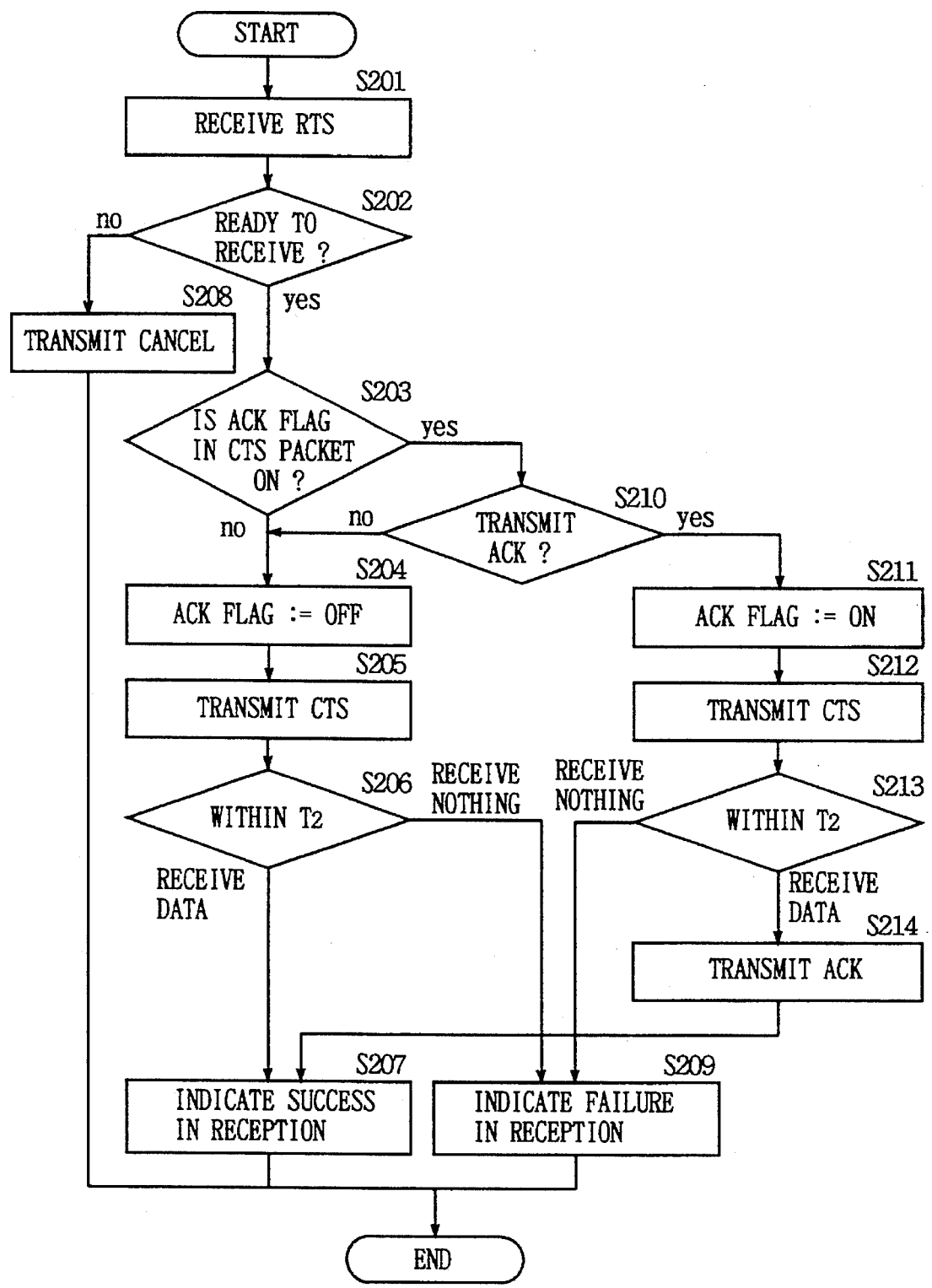
FIG. 5 is a flow chart showing steps of operation of a data receiving apparatus.

FIG. 5 is a flow chart showing operation of a data receiving apparatus. Referring to FIG. 5, a data receiving apparatus B first receives an RTS packet (S201). Then, apparatus B determines whether it is ready to receive data. If apparatus B is not ready to receive data (no at S202), it sends a cancel (CAN) packet (S208). If apparatus B is ready to receive data (yes at S202), it determines whether an ACK flag in the RTS packet is on or not (S203). If not (no at S203), apparatus B turns off the ACK flag in a CTS packet and sends the CTS packet (S204, S205). Then, apparatus B waits to receive a data packet for a prescribed time $T_2$ (S206). If apparatus B cannot receive the data packet, it indicates failure in reception (S209). Otherwise, apparatus B indicates success in reception (S207).

If the ACK flag in the RTS packet is on (yes at S203), apparatus B determines whether to send ACK or not (S210). If an ACK is sent, apparatus B transmits a CTS packet with the ACK flag being on (S211, S212). Apparatus B waits to receive a data packet for prescribed time $T_2$ as described previously (S213), and sends an ACK packet if it receives data, indicating success in receiving data (S214, S207). If apparatus B receives nothing, it indicates failure in receiving data (S209).

A format of each of packets described above will now be described. FIGS. 6A–6C show formats of the packets, respectively. FIGS. 6A–6C are formats of an RTS packet, a CTS packet, and a cancel packet, respectively. Referring to FIG. 6A, the RTS packet, for example, consists of 20 bytes, in which 6 bytes from a zeroth byte to a fifth byte represent an address of a receiving apparatus, and 6 bytes from a sixth byte to a eleventh byte represent an address of a transmitting apparatus. Twelfth and thirteenth bytes represent an upper layer protocol, and fourteenth and fifteenth bytes represent a packet type. Sixteenth and seventeenth bytes represent an ID, and most significant eighteenth and nineteenth bytes represent an ACK flag.

As described above, a packet type is determined by means of fourteenth and fifteenth bytes, and decision whether an ACK is sent or not is made by means of least significant eighteenth and nineteenth bits of a flag. In this case, an ACK is sent if the least significant bits of the flag are 0, and an ACK is not sent if the least significant bits of the flag are 1.

FIGS. 7A and 7B show formats of a DATA packet and an ACK packet, respectively. Basic structures thereof are similar to those in FIGS. 6A–6C. In the data packet, a data length shares a field with a packet type by making a minimum data length 4 bytes. Data length and packet type may have mutually different fields, that is, packet type can be set in a specific dedicated field. Any packet format can be used in the present invention.

Figure 8:
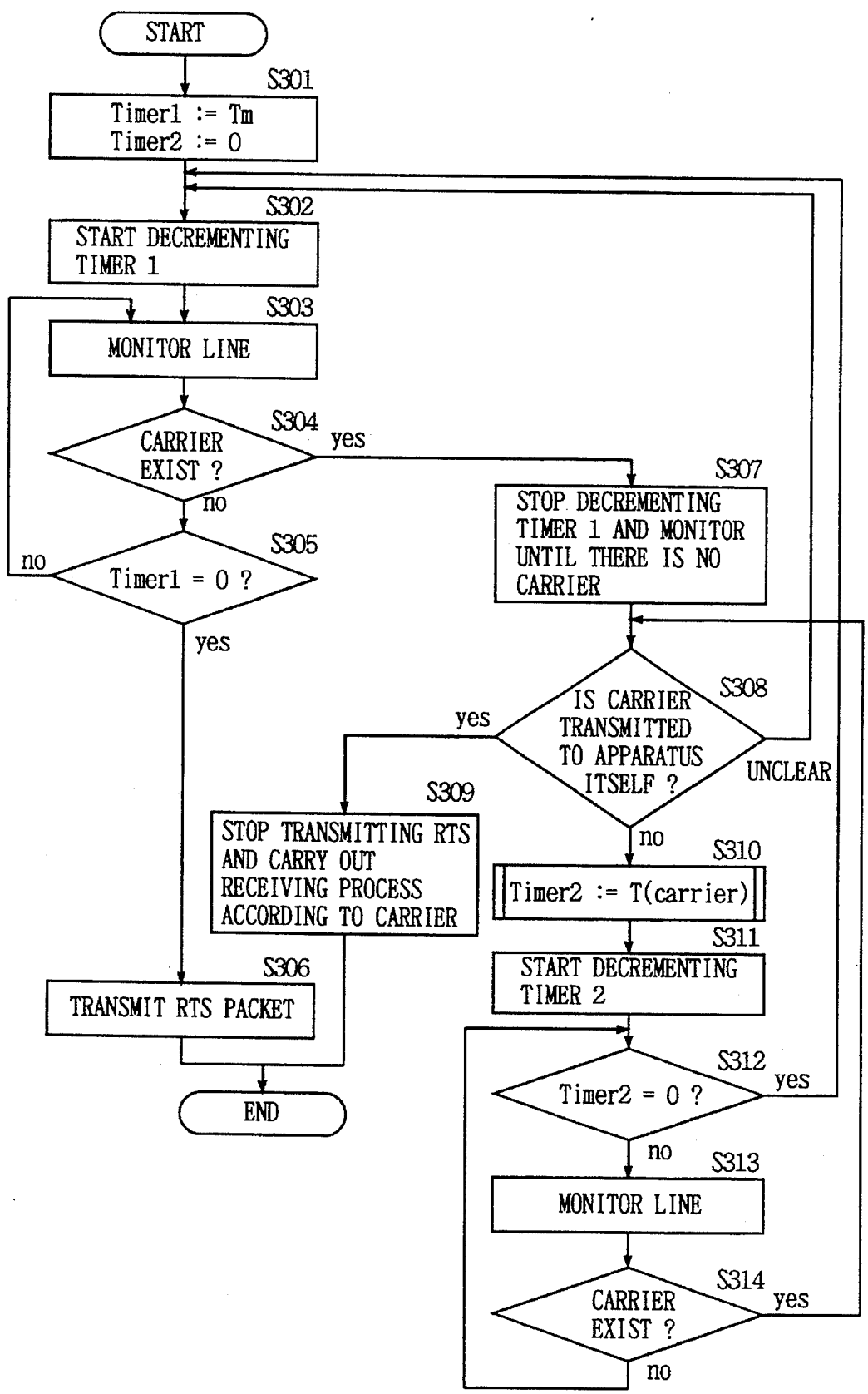
FIG. 8 is a flow chart showing steps of operation from the beginning to transmission of an RTS packet.
Figure 9:
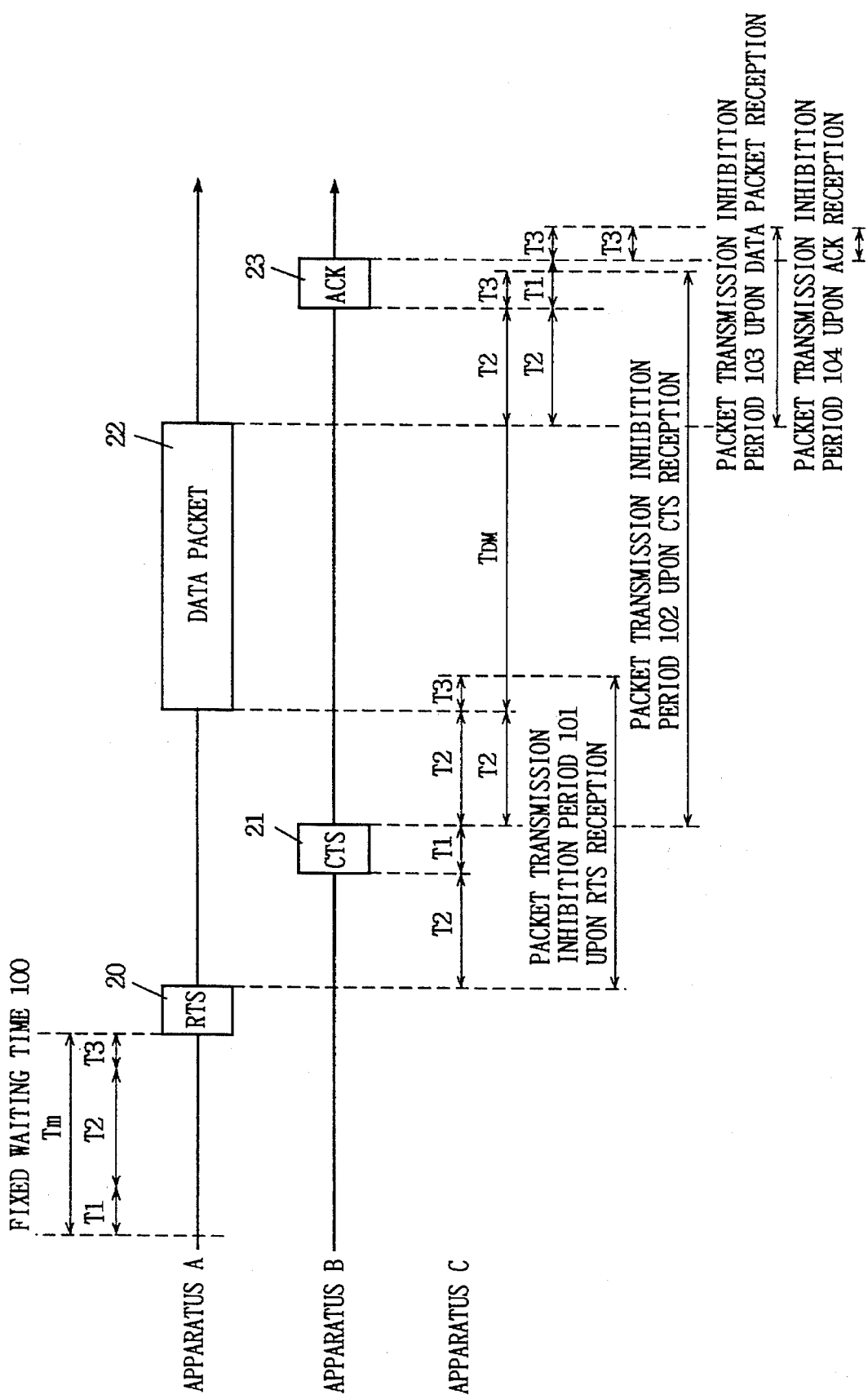
FIG. 9 is a diagram showing a packet transmission inhibition period set to a timer when an ACK is transmitted.
Figure 10:
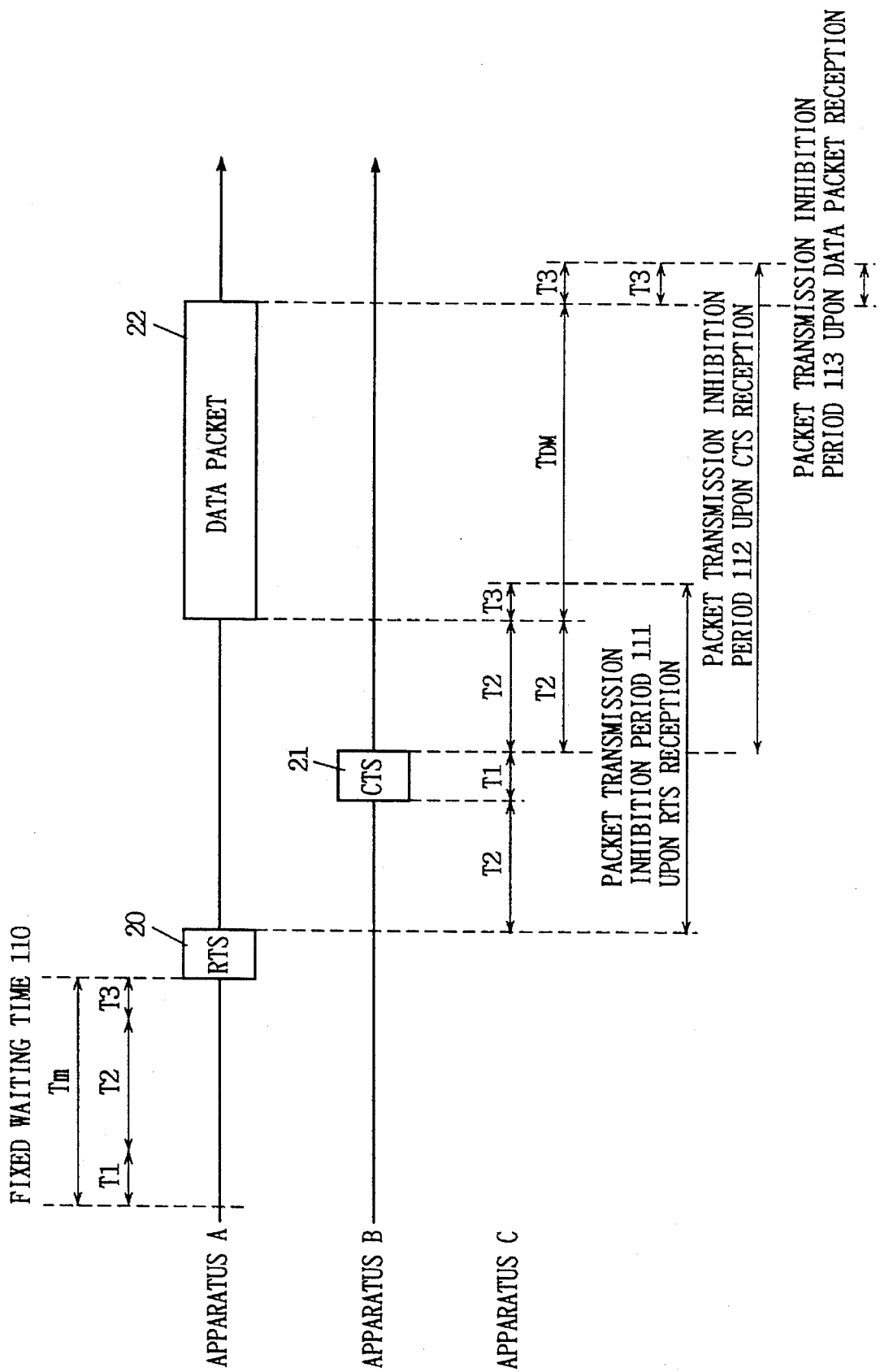
FIG. 10 is a diagram showing a packet transmission inhibition period set to a timer when an ACK is not transmitted.

Each step of operation of the apparatus will now be described in detail with reference to FIG. 8. FIG. 8 is a flow chart showing procedure which is carried out when apparatus A transmits an RTS packet to apparatus B, and FIGS. 9 and 10 are diagrams respectively showing a packet transmission inhibition period of an apparatus C (not shown) which shares the media with apparatuses A and B. FIG. 9 shows an example in which an ACK flag is set, and FIG. 10 is a diagram corresponding to FIG. 9, showing an example in which an ACK is not set in a detected carrier. Specific description will now be given with reference to FIGS. 8–10. In the following description, a timer itself is referred to as a "Timer 1" or a "Timer 2", and variable slot for setting the timer with a time is referred to as a "Timer 1", or a "Timer 2".

The procedure from the beginning to transmission of an RTS packet from apparatus A to apparatus B will now be described with reference to FIG. 8. As described in conjunction with FIG. 1, apparatus A includes two timers, that is, timer 1 and timer 2. Basically, apparatus A waits to send an RTS packet for a fixed waiting time of at least Tm by means of timer 1. Therefore, timer 1 and 2 are first initialized to the fixed waiting time Tm and 0, respectively (S301).

The fixed waiting time herein corresponds to each of fixed waiting times 100 and 110 in FIGS. 9 and 10. As shown in FIGS. 9 and 10, fixed waiting time Tm is defined by the following equation;

$$Tm = T_1 + T_2 + T_3$$

where $T_1$ is a time required for transmission of each of an RTS packet, a CTS packet, a CAN packet and an ACK packet, $T_2$ is a maximum permissible time, which is preset in a system, from transmission of each packet by an apparatus to transmission of a corresponding packet by a terminal which has received the packet, and $T_3$ is a physical transmission delay time. Although $T_3$ is shown to be relatively long for better understanding in the figures, $T_3$ is actually much shorter than $T_2$.

As described above, Tm is a time an apparatus takes to transmit an RTS packet actually after requesting transmission of an RTS packet. In addition, Tm is necessary to prevent disturbance of a CTS packet corresponding to an RTS packet, if any, transmitted by another terminal just before the apparatus requests transmission of an RTS packet.

Then, the value of timer 1 begins to be decremented, and a line is monitored to check whether a carrier is present or not (S302–S304). If there is no carrier (no at S304), apparatus A transmits an RTS packet after lapse of the above described fixed waiting time Tm (yes at S305, S306).

It is now assumed that there is a carrier on the line (yes at S304). In this case, operation of apparatus C which shares the media with apparatus A and apparatus B which transmits to and receives data from each other in FIGS. 9 and 10 will be described. Apparatus C also includes timer 1 and timer 2 described above. It is noted that apparatus C can receive a carrier from only one of apparatuses A and B.

First, apparatus C stops decrementing the value of timer 1 in order to sense a carrier on the line, and monitors the line until there is no carrier sensed on the line (S307). Then, apparatus C determines whether the carrier is sent to apparatus C itself or not (S308). If the carrier is sent to apparatus C itself, apparatus C stops transmitting an RTS packet in a manner similar to that in apparatus B, and carries out receiving process according to a type of the carrier (S309).

If the carrier is sent not to apparatus C (no at S308), apparatus C sets a packet transmission inhibition period, which will be described later as timer 2, according to a type of a carrier, and begins to decrement the value of timer 2 (S310, S311). Then, apparatus C waits for the value of timer 2 to be 0 (S312–S314), and carries out the process again from the beginning (return to S302).

When apparatus C receives, during operation of timer 2, a carrier which is different from that received at the time of setting Timer 2 according to a packet indicating the last communication, Timer 2 is reset according to the type of the newly received carrier.

Figure 11:
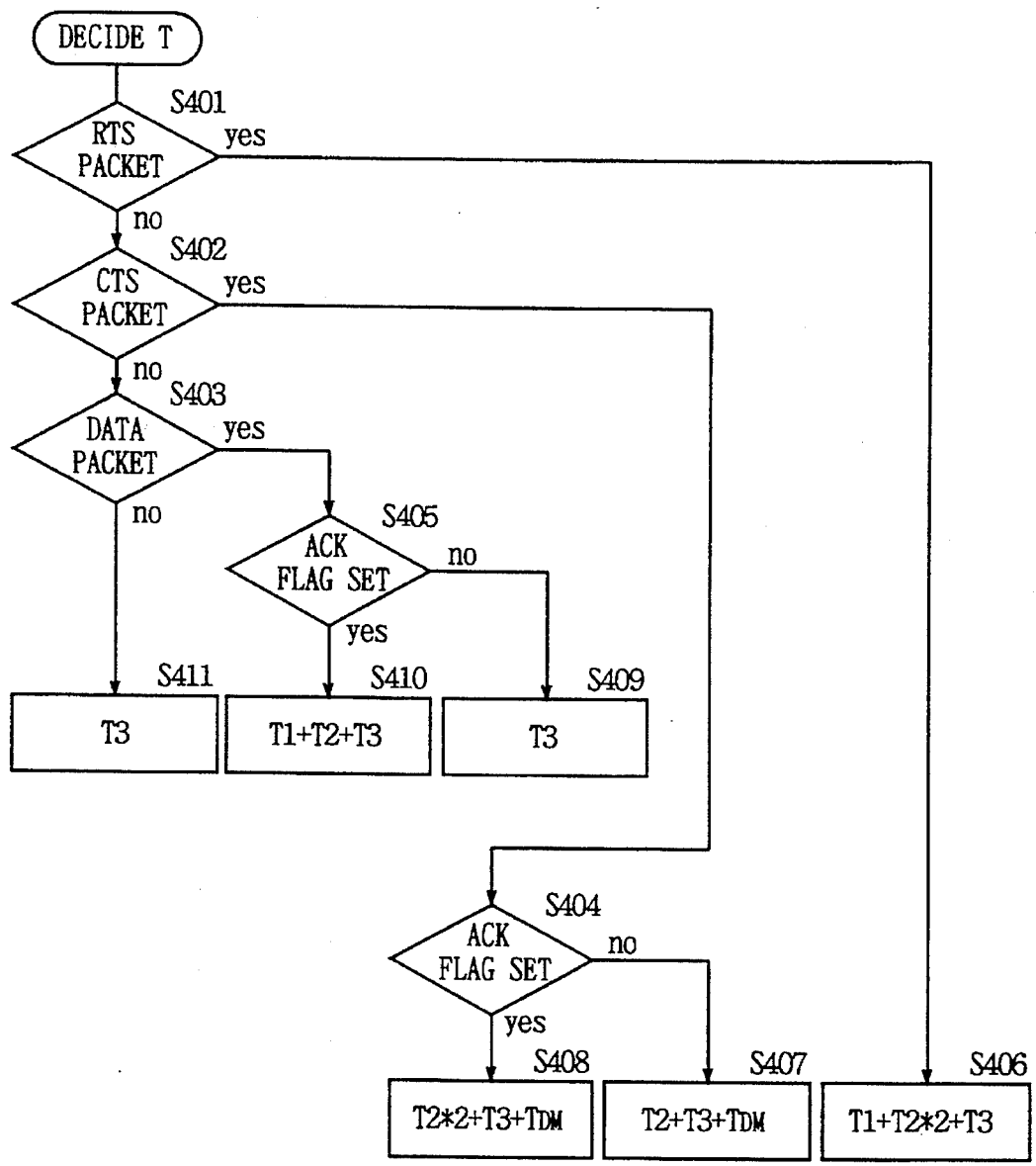
FIG. 11 is a flow chart showing a subroutine which determines a value of a Timer 2.

A packet transmission inhibition period of apparatus C which shares the media with apparatuses A and B but might sense a packet from only one of apparatuses A and B will now be described with reference to FIGS. 9, 10 and 11. FIG. 11 is a flow chart showing a subroutine for determining a value of Timer 2, shown in S310 of FIG. 8. It is assumed that apparatus C senses an RTS packet transmitted by apparatus A (yes at S401). In this case, a packet transmission inhibition period 101 or 111 upon reception of an RTS (S406), which is shown in FIGS. 9 or 10, is set as a set value of timer 2 by apparatus C. More specifically, the set value of timer 2 is defined by the following equation.

$$\text{Timer } 2 = T_1 + T_2 * 2 + T_3$$

Since apparatus C might not sense a CTS packet transmitted from apparatus B, such a value as described above is set as a value of timer 2 in order to prevent disturbance of a CTS packet transmitted by apparatus B. Since apparatus C should always sense a data packet transmitted by apparatus A which has transmitted an RTS packet, a data packet transmission period need not to be included in the transmission inhibition period 101, 111.

When apparatus C senses a CTS packet transmitted by apparatus B (yes at S402), a packet transmission inhibition period is set depending on whether an ACK flag is set or not. In other words, a period corresponding to a packet transmission inhibition period 102 upon CTS reception shown in FIG. 9 is set (S408) when an ACK flag is set (yes at S404), and a period corresponding to a packet transmission inhibition period 112 shown in FIG. 10 is set (S407) when an ACK flag is not set (no at S404). More specifically, a value defined in the following equations is set as a value of timer 2.

$$\text{Timer } 2 = T_2 * 2 + T_3 + T_{DM} \text{(ACK flag is on)}$$

$$\text{Timer } 2 = T_2 + T_3 + T_{DM} \text{(ACK flag is off)}$$

Since apparatus C might not sense a data packet transmitted by apparatus A, such a value as described above is set in apparatus C in order to prevent disturbance of a data packet transmitted by apparatus A. In the equations, $T_{DM}$ is a time to output data having the maximum data length, that is, the time required for a data packet having a longest data portion to be transmitted.

When apparatus C senses a data packet of apparatus A (yes at S403), a period corresponding to an inhibition period 103 of FIG. 9 or a period corresponding to an inhibition period 113 of FIG. 10 is set as a value of timer 2 (S409, S410) depending on whether an ACK flag is set or not (S405).

$$\text{Timer } 2 = T_1 + T_2 + T_3 \text{(ACK flag is on)}$$

$$\text{Timer } 2 = T_3 \text{(ACK flag is off)}$$

Since apparatus C might not sense an ACK packet of apparatus B as described above, such a value as defined by the above equations is set in order to prevent disturbance of an ACK packet transmitted by apparatus B (when an ACK flag is on).

When apparatus C senses an ACK packet or a CAN packet (not shown) (no at S403), a packet is inhibited from being transmitted for a period corresponding to packet transmission inhibition period 104 upon ACK reception shown in FIG. 9 (S411). In this case, a value of timer 2 is defined by the following equation.

$$\text{Timer } 2 = T_3$$

More specifically, packet transmission is inhibited for delay time. It is noted that a value of timer 2 is set upon completion of packet reception.

Specific set value of a timer will now be described. In the present embodiment, it is assumed that data transfer rate is 1 Mbps, the maximum data length is 1024 bytes, and each of RTS, CTS, CAN and ACK packets is 20 bytes.

In this case, time $T_1$ required for transmission of each of RTS, CTS, cancel and ACK packets is defined as 160 microseconds by the following equation.

$$T_1 = 20 * 8 / 1,000,000 = 160 * 10^{-6}$$

20*8 results from the fact that 1 byte consists of 8 bits.

The minimum time $T_2$ required for an apparatus to transmit a CTS packet after receiving an RTS packet, which changes depending on a speed of an apparatus, is about 1.0 millisecond in this case.

About 30 microseconds are allowed for physical transmission delay time $T_3$. Although this transmission delay time $T_3$ can be 0 theoretically, margin for safety is taken into consideration in this case.

Time $T_{DM}$ required for transmission of the longest data packet can be 8.352 milliseconds from the following equation.

$$T_{DM} = (1024 + 20) * 8 / 1,000,000$$

In this case, 1024 bytes constitute the longest data packet, and $T_{DM}$ can be obtained by adding 20 bytes of a header portion to 1024 bytes, converting the resulting bytes into bits, and dividing the resulting bits by a value of transfer rate.

It is noted that these specific values including data transfer rate are not intended to limit the present invention, and the present invention can widely be applied to wireless communication apparatuses.

Figure 12:
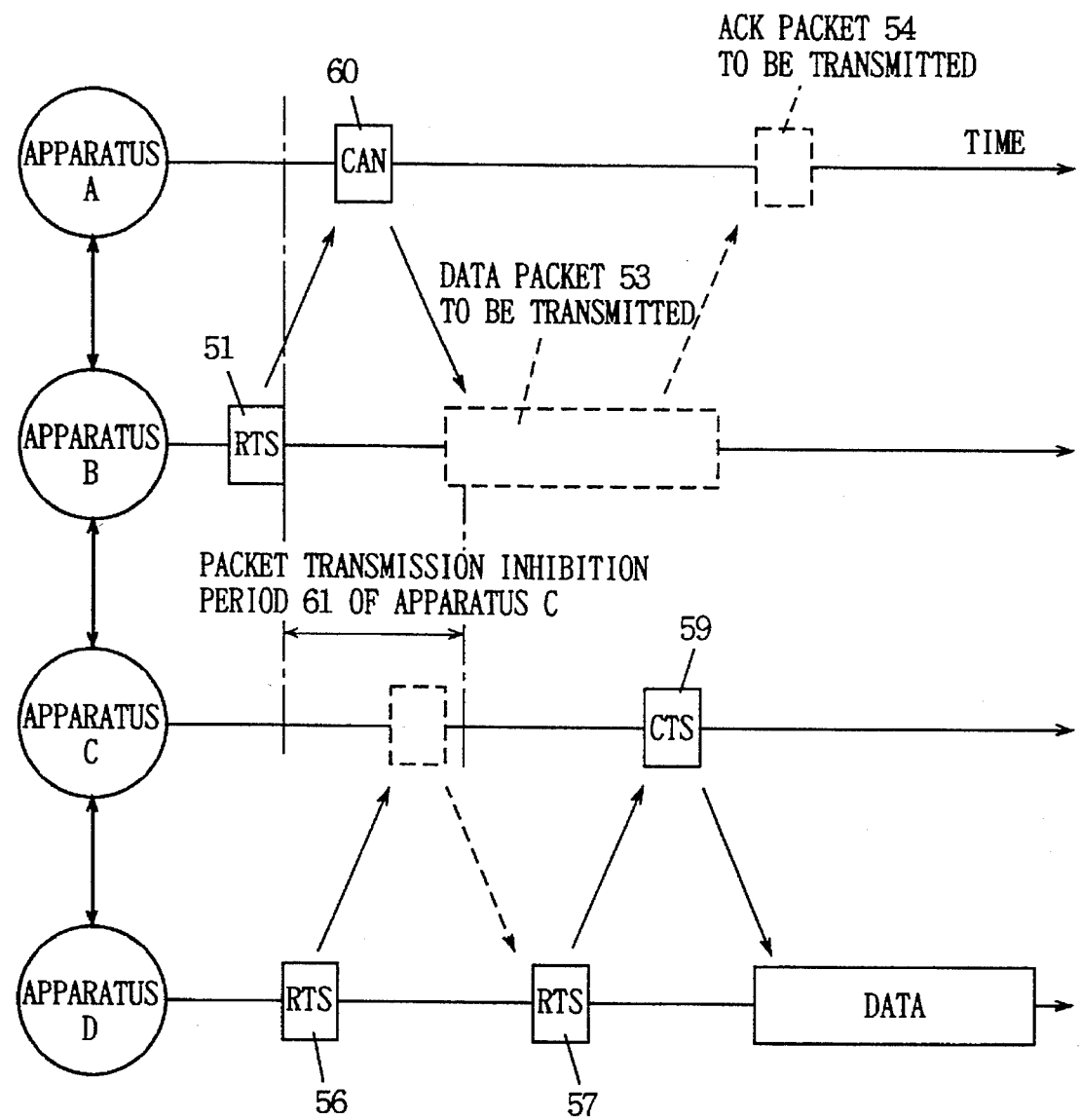
FIG. 12 is a diagram illustrating a condition in which efficiency in using the media is improved.

Effects of the present invention will now be described. FIG. 12 is a diagram showing a period during which each of apparatuses to which the present invention is applied inhibits packet transmission, and corresponds to a diagram of the conventional example shown in FIG. 19. Referring to FIG. 12, data communication can be carried out only between apparatuses A–D shown by arrows, as in the case of FIG. 19.

In this case, it is assumed that apparatus B transmits an RTS packet to apparatus A, and that apparatus A cannot respond thereto and sends a cancel (CAN) packet 60 to apparatus B.

Apparatus C senses an RTS packet of apparatus B, and inhibits transmission of a packet for a packet transmission inhibition period 61 of apparatus C. If apparatus A is normally ready to receive data, apparatus C could sense a data packet 53 transmitted by apparatus B. In this case, however, since apparatus C does not sense data packet 53 transmitted by apparatus B, apparatus C determines that it can transmit data to apparatus B. If apparatus D desires to transmit an RTS packet 56 to apparatus C at this time, apparatus C does not receive RTS packet 56 transmitted during packet transmission inhibition period 61 but an RTS packet 57 transmitted after inhibition period 61, and can return CTS packet 59 to apparatus D.

Figure 19:
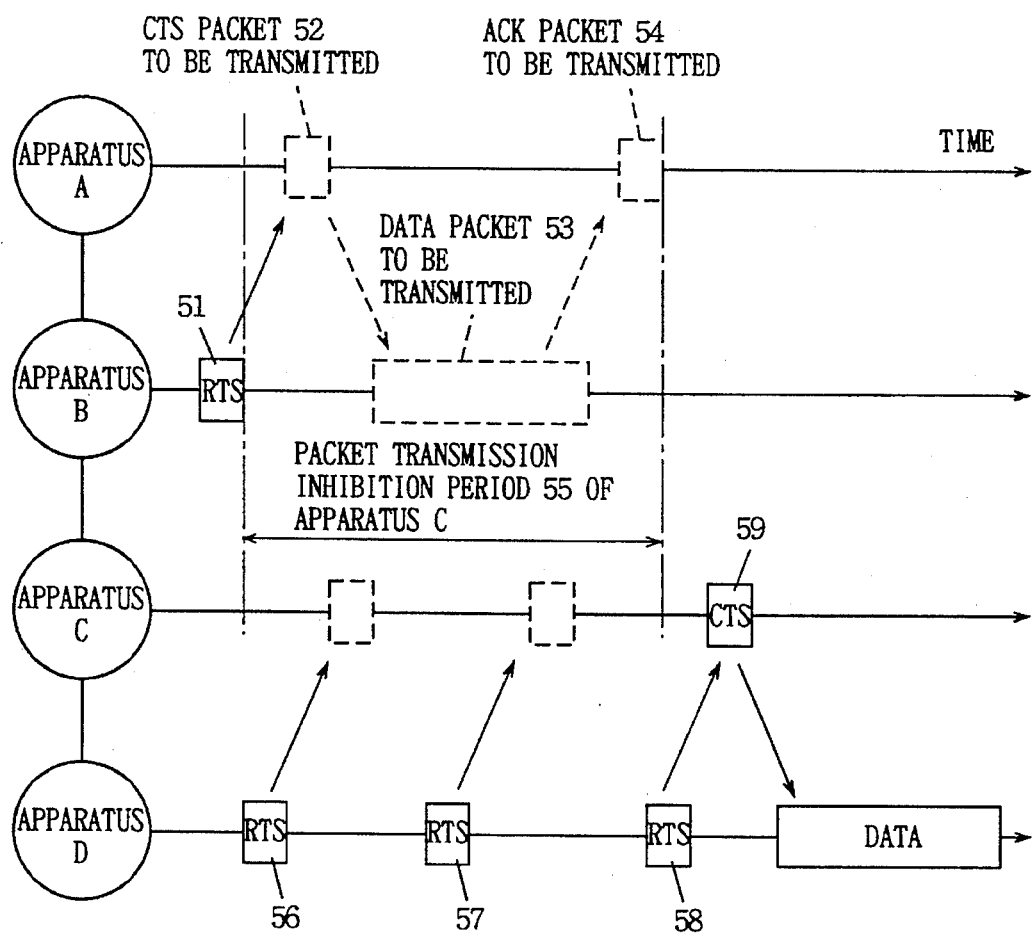
FIG. 19 is a diagram illustrating low efficiency in using the media in the conventional example.

As has been described above, packet transmission inhibition period 61 of apparatus C in the present invention is shorter than that in the conventional example shown in FIG. 19, resulting in higher efficiency in using the media. This is because time required for apparatus B to transmit a data packet is excluded from a period during which apparatus C inhibits packet transmission in response to RTS packet 51 of apparatus B.

Figure 13:
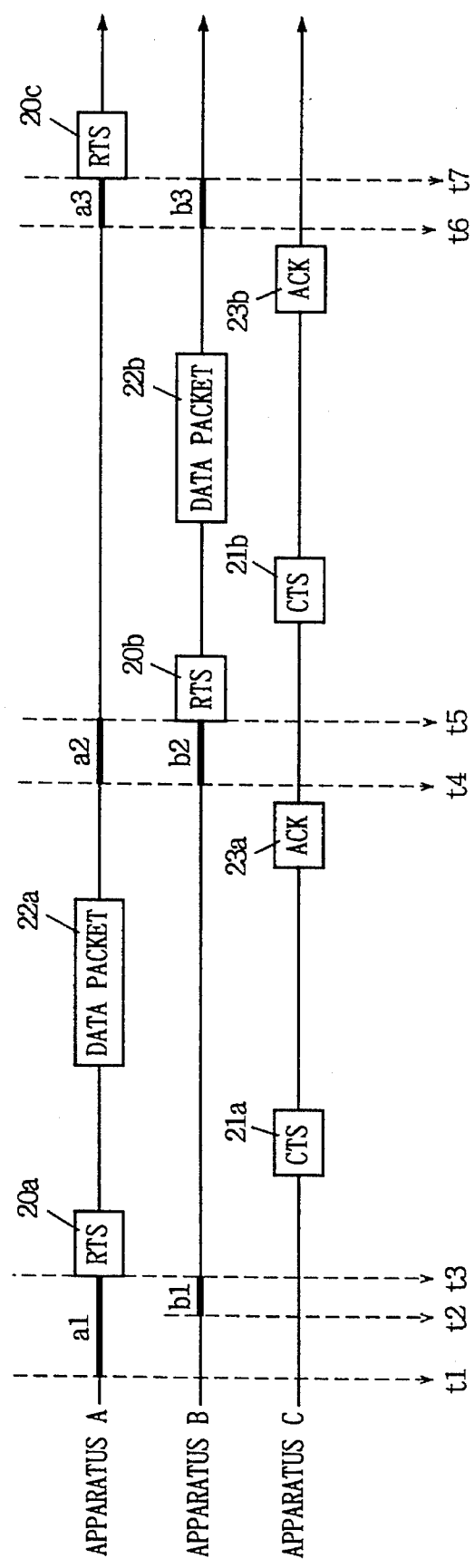
FIG. 13 is a diagram illustrating how continuous reception of data is ensured.

Process carried out when transmissions from a plurality of apparatuses conflict with each other will now be described. FIG. 13 shows a condition of packet transmission when apparatuses A, B and C can communicate with each other, and both apparatuses A and B transmit data to apparatus C. Referring to FIG. 13, an x axis represents time. In FIG. 13, t1 indicates time when apparatus A requests transmission of $Pa_0$, t2 indicates time when apparatus B requests transmission of $Pb_0$, t3 indicates time when apparatus A transmits RTS packet 20a of $Pa_0$, t4 indicates time when a series of packet switching (from apparatus A to apparatus C) is completed, t5 indicates time when apparatus B transmits RTS packet 20b of $Pb_0$, t6 indicates time when a series of packet switching (from apparatus B to apparatus C) is completed, and t7 indicates time when apparatus A transmits RTS packet 20c of $Pa_1$.

Each of apparatuses A–C waits, upon transmission of data, to transmit RTS packet 20 for a fixed waiting time of at least Tm using timer 1 in such a manner as described above. If an apparatus which desires to transmit data senses transmission of data packet 22 between other apparatuses during the fixed waiting time, it inhibits packet transmission using timer 2 for a period necessary for communication between other apparatuses. If an apparatus which desires to transmit data senses, during a period of timer 1, transmission of a data packet between other apparatuses, a set value of timer 1 is counted from the time when an apparatus desires to transmit data, and a sum of the time before and after the transmission of the data packet between other apparatuses is set as the fixed waiting time Tm.

This will be described more specifically with reference to FIGS. 8 and 13. If apparatus B desires to transmit data to apparatus C at time t2, it monitors the line (S301–S303). If apparatus B senses an RTS packet 20a of apparatus A at time t3, apparatus B stops decrementing a value of timer 1 and monitors the line until there is no carrier (S307). Since RTS packet 20a sensed by apparatus B is not transmitted to apparatus B itself, Timer 2 for an RTS packet is set as a value of timer 2 (S310). Apparatus B monitors the line, senses communication between apparatuses A and C, and changes a set value of timer 2 according to a type of a transmitted packet (S311–S314, S308, S310, S311). Then, if apparatus B senses completion of communication between apparatuses A and C (no at S314), apparatus B waits for timer 2 to be 0 (yes at S312, corresponding to time after ACK packet transmission inhibition period 104 is completed in FIG. 9), and begins to decrementing a value of timer 1 which has been stopped at S307 (S302). Then, if a value of timer 1 is decremented to 0 (yes at S305), apparatus B transmits RTS packet 20b to apparatus C.

Accordingly, the following equations can be obtained in FIG. 13.

$a1 = Tm = T_1 + T_2 + T_3$ $b1 + b2 = Tm$ $a2 + a3 = Tm$

Each of periods a1, a2, a3, b3, b2 and b3 in the above equations is a period during which a value of timer 1 is decremented. At time t4, apparatuses A and B request transmission of a packet. In the conventional example P, since apparatuses A and B request packet transmission at time t4 simultaneously for transmission of an RTS packet, a random number is used in order to prevent conflict between apparatuses A and B. Accordingly, as described above, order of transmitted data might not be maintained.

In contrast, the present invention ensures that Timer 1 of apparatus A (an initial value=Tm) is larger than Timer 1 of apparatus B at time t4. Therefore, at time t5, that is, when "apparatus B transmits an RTS packet", Timer 1 of apparatus A (an initial value=Tm) is larger than 0.

Similarly, the present invention ensures that Timer 1 of apparatus B (an initial value=Tm) is larger than Timer 1 of apparatus A at t7. As a result, order of data transmitted by apparatuses A and B can be maintained.

Although infrared rays are used as wireless media in the present embodiment, visible light can be used similarly.

(2) Second Embodiment

Figure 14:
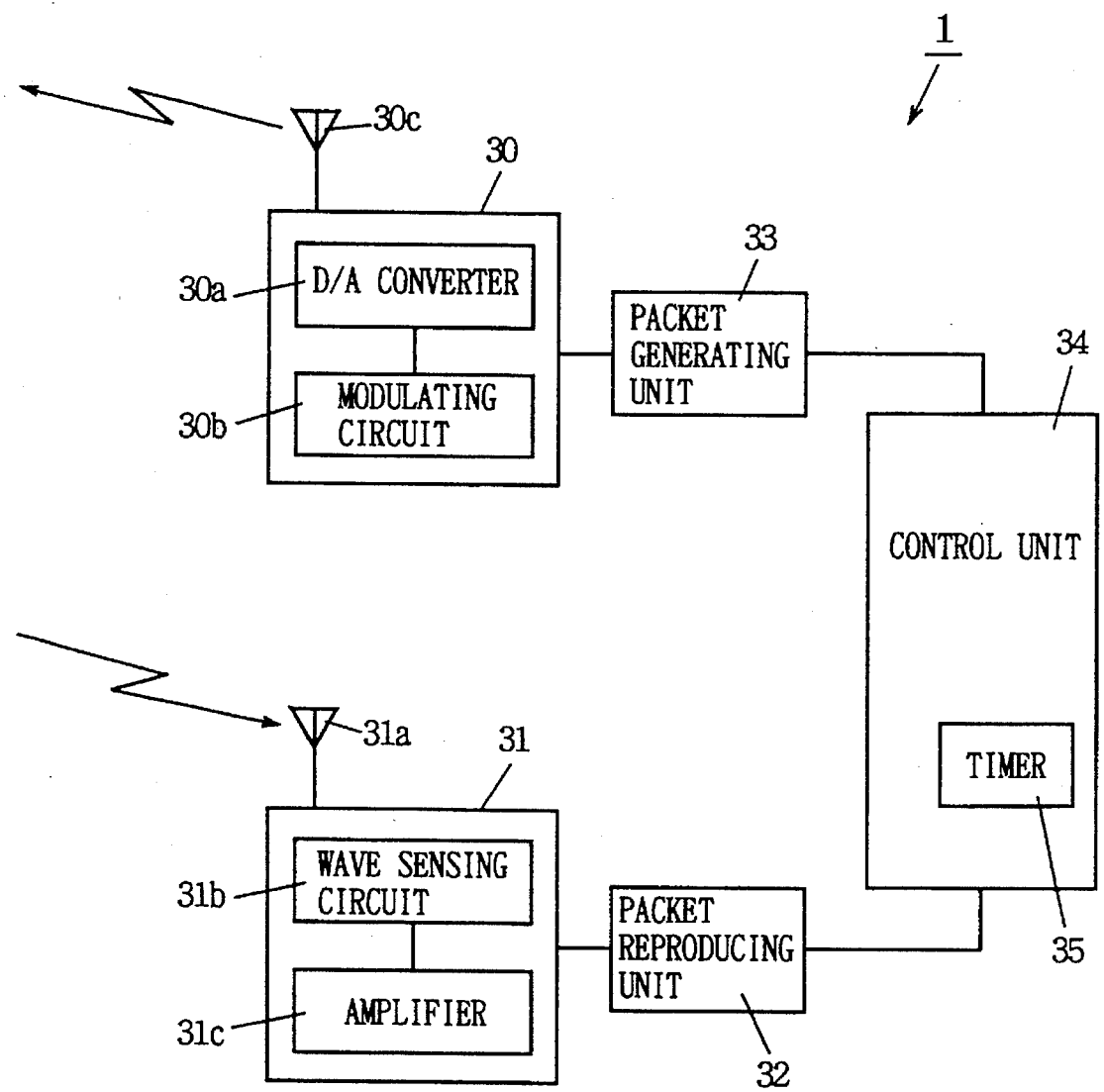
FIG. 14 is a block diagram showing an important portion of a data communication apparatus in accordance with a second embodiment of the present invention.
Figure 16:
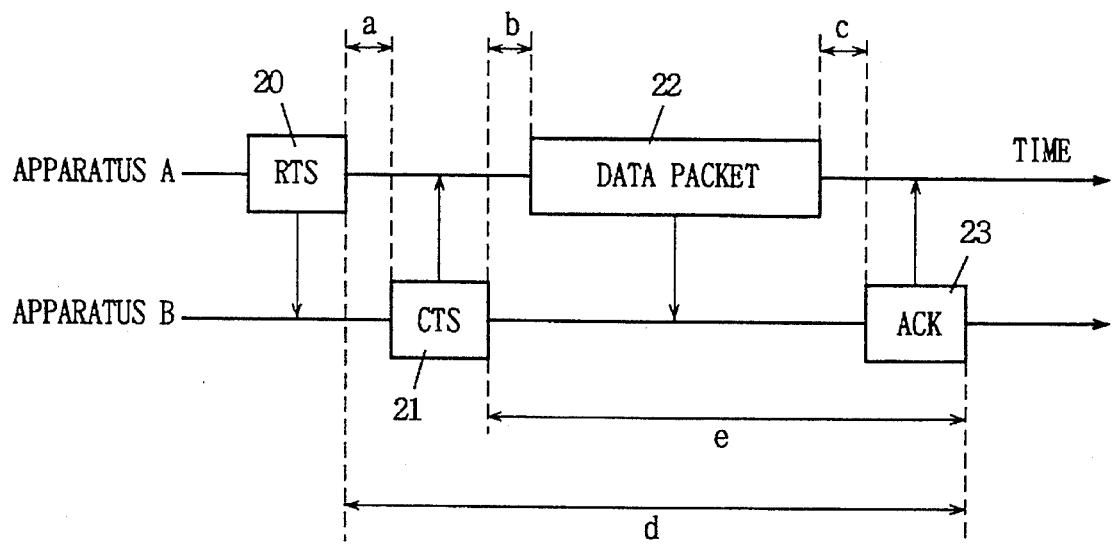
FIG. 16 is a diagram showing a basic operation of a conventional example.
Figure 17:
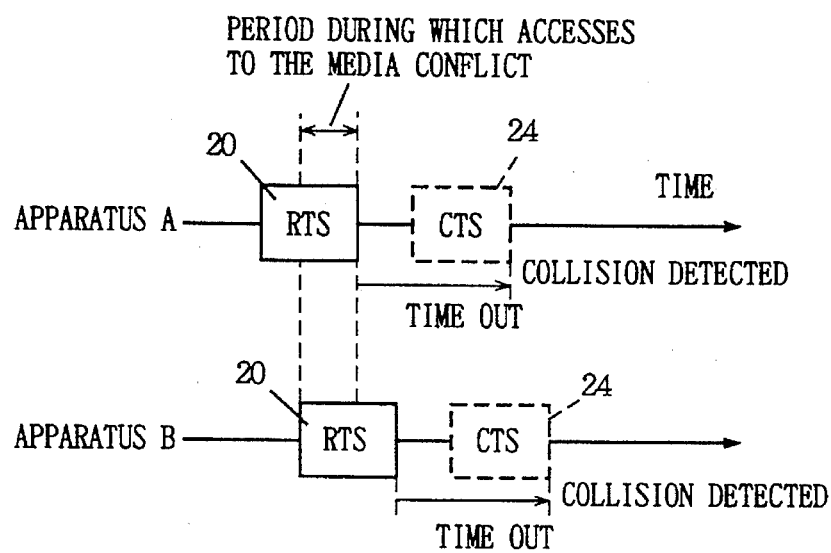
FIG. 17 is a diagram showing conflict between accesses to the media in the conventional example.
Figure 18:
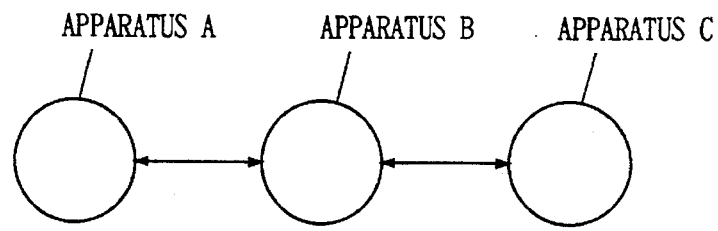
FIG. 18 is a diagram showing a condition in which a hidden terminal is generated.

An example in which electric wave is used as wireless media will now be described. FIG. 14 is a block diagram showing an arrangement of a data communication apparatus in accordance with a second embodiment of the present invention.

Referring to FIG. 14, data communication apparatus 1 includes a wireless transmitting unit 30 for transmitting a data packet to another communication apparatus, a packet generating unit 33 connected to wireless transmitting unit 30 for generating a packet, a wireless receiving unit 31 for receiving a packet from another communication apparatus, a packet reproducing unit 32 for reproducing the received packet, and a control unit 34 for controlling the whole apparatus. Control unit 34 includes a timer 35 which is similar to that in the first embodiment.

Wireless transmitting unit 30 is constituted by a D/A converter 30a for converting a digital code train into an electric signal, a circuit 30b for amplifying and modulating an electric signal, and an antenna 30c for emitting the modulated signal into the air as electric wave. Wireless receiving unit 31 is constituted by an antenna 31a for receiving an electric wave signal, a wave sensing circuit 31b, and an amplifier 31c for amplifying the sensed electric signal. Packet reproducing unit 32 converts an electric signal into a digital code train, and includes an A/D converter (not shown). Packet generating unit 33 includes an RTS packet generating program, a CTS packet generating program, a data packet generating program, an ACK packet generating program, and a cancel packet generating program, all of which are not shown.

Although procedure for transmission and reception of a packet is the same as that in the first embodiment, a parameter is changed depending on the maximum transfer rate. FIG. 15A shows methods employing mutually different maximum transfer rates in the second embodiment, and FIG. 15B shows times $T_1$, $T_2$, $T_3$ and $T_{DM}$ in the case of using the methods shown in FIG. 15A. FIG. 15A shows a frequency, an occupied bandwidth, and the maximum transfer rate for each method, and FIG. 15B shows time for each method. FIG. 15B shows times for each method. Times shown in FIG. 15B are defined in the same manner as those in the first embodiment. In addition, Timer 1 and Timer 2 are set in a manner similar to that in the first embodiment.

Although examples in which the present invention is applied to wireless communication has been described in the first and the second embodiments, the present invention can be applied to cable communication. However, when the present invention is applied to communication in which infrared rays are used as wireless media, so called "hidden terminal" problem is likely to occur due to high directivity of infrared rays. In addition, when electric wave is used as wireless media, "a hidden terminal" is generated due to difference in output power. The present invention is particularly effective in improving efficiency in using the media in such a condition as described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data communication apparatus which carries out data communication between a plurality of apparatuses which share same media, comprising:

transmitted packet generating means for generating a packet to be transmitted to said media;

transmitting means for transmitting said generated packet to said media;

packet receiving means for receiving a received packet from said media;

packet reproducing means for reproducing said received packet;

means for detecting a detected time when said transmitting means desires data transmission;

first time setting means for setting a first prescribed time period from said detected time when said transmitting means desires data transmission;

first determining means for determining whether data communication is being carried out between said plurality of apparatuses or not and contents thereof within said first prescribed time period by means of said packet receiving means and said packet reproducing means;

second time setting means for setting a second time period according to a type of a determined packet determined by said first determining means, when said first determining means determines that data communication is being carried out between other apparatuses; and controlling means for controlling said transmitting means to transmit a prescribed packet according to said determined packet after lapse of said first prescribed time period and said second time period.

2. The data communication apparatus according to claim 1, wherein a sum of said first prescribed time period and said second time period is fixed for said plurality of apparatuses, said first prescribed time period is set to be a sum of time before and after said second time period when said first determining means senses data communication between other apparatuses.

3. The data communication apparatus according to claim 1, wherein said transmitting means transmits a data packet after transmission of an RTS (Request To Send) packet which indicates that said transmitting apparatus desires to send data to a receiving apparatus, and reception of a CTS (Clear To Send) packet from said receiving apparatus, which indicates that said receiving apparatus is ready to respond to said RTS packet, and said controlling means controls said transmitting means to transmit, within said first prescribed time period, said CTS packet when a packet determined by said first determining means is an RTS packet transmitted to the apparatus itself, and to send, within said first prescribed time period, said data packet when a packet determined by said first determining means is a CTS packet transmitted to the apparatus itself.

4. The data communication apparatus according to claim 3, further comprising second determining means for determining whether the apparatus itself is ready to receive data or not, wherein said controlling means controls said transmitting means to transmit a cancel packet to a transmitting apparatus within said first prescribed time period, when said first determining means determines that there is an RTS packet transmitted to the apparatus itself and said second determining means determines that the apparatus itself is not ready to receive data.

5. The data communication apparatus according to claim 3 or 4, wherein said controlling means controls said transmitting means to transmit, within said first prescribed time period, an ACK (Acknowledgement) packet which indicates that said transmitting means acknowledges a data packet, when said first determining means determines that there is a data packet transmitted to the apparatus itself.

6. The data communication apparatus according to claim 5, wherein said controlling means controls said packet generating means so that a signal for requesting an ACK packet from a receiving apparatus is included in a packet to be transmitted.

7. The data communication apparatus according to claim 1 wherein said received packet includes at least one of an RTS packet indicating that a transmitting apparatus requests transmission to a receiving apparatus, a CTS packet indicating that the receiving apparatus is ready to respond to said RTS packet, and a data packet including data, said second time setting means sets, as said second time period, a second prescribed time if said packet is an RTS packet, a third prescribed time if said packet is a CTS packet, and a fourth prescribed time if said packet is a data packet, and said second prescribed time is a time period from expiration of said first prescribed time period until transmission of said data packet is initiated, said third prescribed time is a time period from expiration of said first prescribed time period until transmission of a data packet having longest data is completed, and said fourth prescribed time is 0.

8. The data communication apparatus according to claim 1, wherein said packet includes an RTS packet indicating that a transmitting apparatus requests transmission to a receiving apparatus, a CTS packet indicating that the receiving apparatus is ready to respond to said RTS packet, a data packet having data, and an ACK packet indicating that the receiving apparatus acknowledges reception of said data packet, said second time setting means sets, as said second time period, a second prescribed time if said packet is an RTS packet, a third prescribed time if said packet is a CTS packet, a fourth prescribed time if said packet is a data packet, and a fifth prescribed time if said packet is an ACK packet, and said second prescribed time is a time period from expiration of said first prescribed time period until transmission of said data packet is initiated, said third prescribed time is a time period from expiration of said first prescribed time period until transmission of an ACK packet is initiated, and said fourth prescribed time is 0.

9. The data communication apparatus according to claim 7 or 8, wherein said plurality of apparatuses transmit data to each other, whereby conflicting packets might be transmitted to a same apparatus from other apparatuses, each of said plurality of apparatuses includes means for detecting conflict of said packets, and means for regulating with each other so that further conflict with other apparatuses which have conflicted previously does not occur, when said detecting detects conflict of said packets.

10. The data communication apparatus according to claim 1, wherein said data communication apparatus comprises a wireless data communication apparatus.

11. The data communication apparatus according to claim 10, wherein said wireless data communication apparatus includes an infrared data communication apparatus.

12. A method of carrying out data communication between a plurality of apparatuses which share same media, comprising the steps of:

detecting when a transmitting apparatus requests transmission of a packet to said media;

setting a first prescribed time from the time when said request for transmission is detected;

determining, within said first time, whether data communication is being carried out or not between said plurality of apparatuses including a data transmitting apparatus, and contents of data communication of a determined packet;

setting a second time according to a type of said determined packet if it is determined that data communication is being carried out between other apparatuses; and transmitting a prescribed packet according to the determined packet after lapse of said first time and said second time.

13. The method of carrying out data communication according to claim 12, wherein said step of setting a first time includes the step of setting said first time to be a sum of time before and after said second time if it is determined that data communication is being carried out between other apparatuses.

* * * * *